(12) United States Patent
Kim

(10) Patent No.: US 9,469,295 B2
(45) Date of Patent: Oct. 18, 2016

(54) APPARATUS AND METHOD FOR CONTROLLING MODE CHANGE OF HYBRID ELECTRIC VEHICLE

(71) Applicant: Hyundai Motor Company, Seoul (KR)

(72) Inventor: Sangjoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 2 days.

(21) Appl. No.: 14/551,023

(22) Filed: Nov. 23, 2014

(65) Prior Publication Data

US 2016/0031436 A1 Feb. 4, 2016

(30) Foreign Application Priority Data

Jul. 31, 2014 (KR) .................. 10-2014-0098531

(51) Int. Cl.
| | | |
|---|---|---|
| *B60W 20/00* | (2016.01) | |
| *B60W 10/11* | (2012.01) | |
| *B60W 10/02* | (2006.01) | |
| *B60K 6/387* | (2007.10) | |
| *B60K 6/547* | (2007.10) | |
| *B60W 10/06* | (2006.01) | |
| *B60W 10/08* | (2006.01) | |
| *B60K 6/48* | (2007.10) | |

(52) U.S. Cl.
CPC .............. *B60W 20/40* (2013.01); *B60K 6/387* (2013.01); *B60K 6/547* (2013.01); *B60W 10/02* (2013.01); *B60W 10/06* (2013.01); *B60W 10/08* (2013.01); *B60W 10/11* (2013.01); *B60W 20/30* (2013.01); *B60K 2006/4825* (2013.01); *B60W 2510/0642* (2013.01); *B60W 2510/1005* (2013.01); *B60W 2540/103* (2013.01); *B60W 2710/1005* (2013.01); *Y10S 903/93* (2013.01)

(58) Field of Classification Search
CPC .... B60W 20/40; B60W 10/02; B60W 10/11; B60W 20/30; Y10S 903/93
USPC .......................................................... 701/22
See application file for complete search history.

(56) References Cited

U.S. PATENT DOCUMENTS

| | | | |
|---|---|---|---|
| 7,115,064 B2 | 10/2006 | Masterson et al. | |
| 2009/0312895 A1* | 12/2009 | Kim ........................ | B60K 6/365 701/22 |
| 2012/0053768 A1* | 3/2012 | Jeon ......................... | B60K 6/48 701/22 |

FOREIGN PATENT DOCUMENTS

| | | |
|---|---|---|
| JP | 2008-179242 A | 8/2008 |
| JP | 2011-011667 A | 1/2011 |
| KR | 10-2009-0128830 A | 12/2009 |
| KR | 10-1519263 B1 | 5/2015 |

* cited by examiner

*Primary Examiner* — Anne Antonucci
(74) *Attorney, Agent, or Firm* — Mintz Levin Cohn Ferris Glovsky and Popeo, P.C.; Peter F. Corless

(57) ABSTRACT

An apparatus and a method for controlling mode change of a hybrid electric vehicle. For a system having an engine as a power source, a motor selectively connected to the engine via an engine clutch, and a transmission connected to the motor, a method includes determining whether coupling of the engine clutch during a mode change from EV to HEV mode and shifting of the transmission are required, comparing an input speed of a current gear of the transmission with an engine speed in an idle state when the coupling of the engine clutch and the shifting are required, determining whether a kick down shift is required when the input speed of the current gear of the transmission is greater than or equal to the engine speed in the idle state and simultaneously coupling the engine clutch and performing the kick down shift when the kick down shift is required.

14 Claims, 4 Drawing Sheets

APPARATUS AND METHOD FOR CONTROLLING MODE CHANGE OF HYBRID ELECTRIC VEHICLE

CROSS-REFERENCE TO RELATED APPLICATION(S)

Pursuant to 35 U.S.C. §119(a), this application claims the benefit of Korean Patent Application No. 10-2014-0098531, filed on Jul. 31, 2014, the entire contents of which are incorporated herein by reference.

BACKGROUND

1. Field of the Invention

The present invention relates to an apparatus and a method for controlling a mode change of a hybrid electric vehicle (HEV). More particularly, the present invention relates to an apparatus and a method for controlling a mode change of an HEV, by simultaneously performing coupling of an engine clutch and shifting of the transmission during a mode change from an electric vehicle (EV) mode to an HEV mode.

2. Discussion of the Related Art

Generally, a hybrid electric vehicle is driven by a fuel-powered combustion engine and a battery-powered electric motor. Hybrid electric vehicles may be provided with optimum output torque depending on how the engine and the motor are operated while the vehicles are driven by the two power sources, that is, the engine and the motor. For hybrid electric vehicles, a transmission mounted electric device (TMED)-type power train is generally used. A TMED-type power train generally incorporates an engine clutch disposed between the engine and the motor. Thus, the hybrid electric vehicle is driven in an EV mode or an HEV mode depending on engagement (connection) of the engine clutch.

In the TMED-type hybrid electric vehicle, when a driver intends to accelerate, and therefore torque demand is suddenly increased (e.g., a kick down shift is requested), in the EV mode, the hybrid electric vehicle performs a kick down shift control that shifts the transmission to a lower gear. Moreover, the hybrid electric vehicle converts operation from the HEV mode to the EV mode by coupling the engine clutch and using the power of the engine.

Due to complexities associated with transmission shifting control or engine clutch control, either a shifting operation is performed after coupling the engine clutch, or an engine clutch coupling operation is performed after shifting the transmission, according to the torque demand of the driver, when the coupling of the engine clutch and the shifting of the transmission are required simultaneously. Thus, responsiveness of the hybrid electric vehicle may deteriorate and an acceleration demand of the driver may not be satisfied when the shifting operation and the coupling operation of the engine clutch are performed sequentially.

The above information disclosed in this background section is merely for enhancement of understanding of the background of the invention and therefore it may contain information that does not form the prior art that is already known in this country to a person of ordinary skill in the art.

SUMMARY

The present invention provides an apparatus and a method for controlling a mode change of a hybrid electric vehicle for simultaneously performing engine clutch coupling and transmission shifting when both the engine clutch coupling and the shifting of the transmission are required during a mode change from an EV mode to an HEV mode.

An exemplary embodiment of the present invention provides a method for controlling a mode change of a hybrid electric vehicle having an engine as a power source, a motor selectively connected to the engine via an engine clutch, and a transmission connected to the motor, that may include: determining whether coupling of the engine clutch and shifting of the transmission are required during a mode change from an EV mode to an HEV mode; comparing an input speed of a current gear of the transmission with an engine speed in an idle state when the coupling of the engine clutch and the shifting are required; determining whether a kick down shift is required when the input speed of the current gear of the transmission is greater than or equal to the engine speed in an idle state; and simultaneously coupling the engine clutch and performing the kick down shift when the kick down shift is required.

When the input speed of the current gear of the transmission is less than the engine speed in the idle state, the method may further include: performing shifting; and coupling the engine clutch when the input speed of the current gear of the transmission is greater than or equal to the engine speed in the idle state after shifting. When the kick down shift is not required, the method may further include: comparing an input speed of a target gear of the transmission with the engine speed in the idle state; coupling the engine clutch without shifting when the input speed of the target gear of the transmission is less than the engine speed in an idle state; and performing shifting after coupling of the engine clutch. When the input speed of the target gear of the transmission is greater than or equal to the engine speed in an idle state, the method may further include performing shifting and coupling the engine clutch.

Another exemplary embodiment of the present invention provides an apparatus for controlling a mode change of a hybrid electric vehicle having an engine as a power source, a motor selectively connected to the engine via an engine clutch, and a transmission connected to the motor, that may include: a driving information detector configured to detect a current driving state of the hybrid electric vehicle; and a controller configured to operate of the transmission and the engine clutch based on a signal output from the driving information detector. In addition, the controller may be configured to compare an input speed of a current gear of the transmission with an engine speed in an idle state when coupling of the engine clutch and shifting of the transmission are required, and to simultaneously perform coupling of the engine clutch and shifting when the input speed of the current gear of the transmission is greater than or equal to the engine speed in an idle state and a kick down shift is required.

The driving information detector may include at least one of a vehicle speed sensor, a motor speed sensor, an engine speed sensor, and an accelerator pedal position sensor. The controller may be configured to simultaneously perform the coupling of the engine clutch and the shifting in a real shifting region of the transmission. It should be noted that "a real shifting region" is intended to mean a region where a pressure of operating elements of the transmission is changed for actual shifting. The controller may be configured to perform a shift when the input speed of the current gear of the transmission is less than the engine speed in the idle state, and may be configured to couple the engine clutch after shifting when the input speed of the current gear of the transmission is greater than or equal to the engine speed in an idle state. The controller may be configured to compare an input speed of a target gear of the transmission with the engine speed in the idle state when the kick down shift is not required, may be configured to couple the engine clutch in advance without shifting, when the input speed of the target gear of the transmission is less than the engine speed in the idle state, and may be configured to perform shifting after coupling of the engine clutch. The controller may further be configured to perform the shifting and couple the engine clutch when the input speed of the target gear of the transmission is greater than or equal to the engine speed in the idle state.

As described above, according to an exemplary embodiment of the present invention, when a driving mode of the hybrid electric vehicle is changed from the EV mode to the HEV mode, drivability and responsiveness of the hybrid electric vehicle may be improved by simultaneously performing coupling of the engine clutch and shifting of the transmission.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
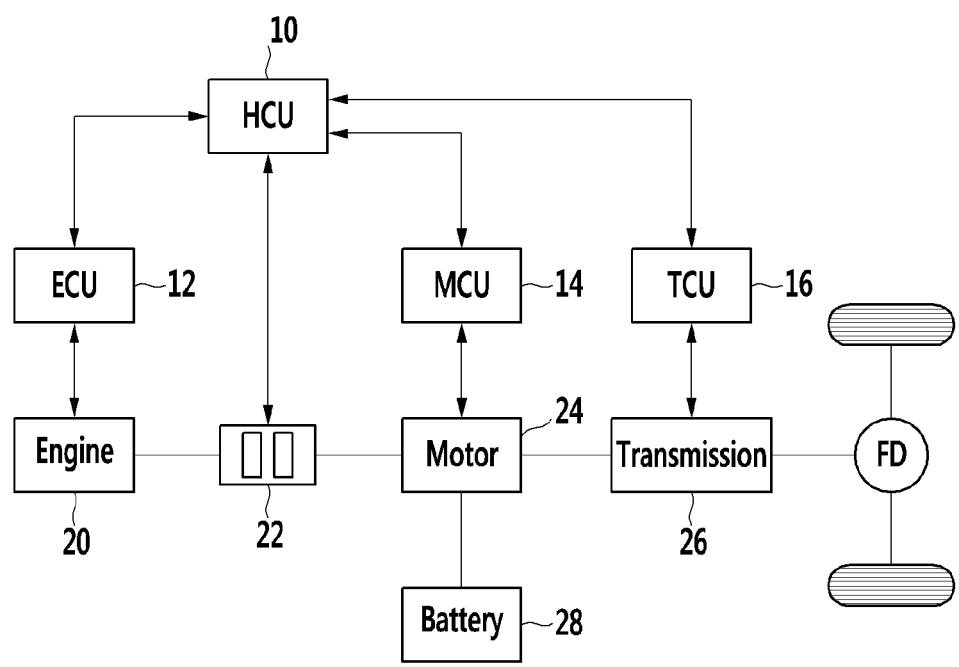
FIG. 1 is an exemplary diagram of a hybrid system to which a method for controlling a mode change of a hybrid electric vehicle is applied, according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "a bout" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

An exemplary embodiment of the present invention will hereinafter be described in detail with reference to the accompanying drawings. FIG. 1 is an exemplary diagram of a hybrid system to which a method for controlling a mode change of a hybrid electric vehicle may be applied according to an exemplary embodiment of the present invention. It should be noted that methods for controlling engine starting while shifting of a hybrid electric vehicle according to exemplary embodiments of the present invention may not only be applied to the hybrid system as shown in FIG. 1, but may also be applied to all other hybrid systems.

As shown in FIG. 1, a hybrid system according to exemplary embodiments of the present invention may include a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28. The HCU 10 may be configured to operate other controllers which may mutually exchange information in an entire operation of a hybrid electric vehicle. In other words, the HCU 10 may be configured to adjust output torque of the engine 20 and the motor 24 by cooperating with the other controllers. The ECU 12 may be configured to operate the engine 20 according to conditions of the engine 20, such as, but not limited to, a torque demand (e.g., a torque demand of a driver), a coolant temperature, and an engine torque. The MCU 14 may be configured to control operation of the motor 24 according to a torque demand (e.g., a torque demand of a driver), a driving mode of the hybrid electric vehicle, and a state of charge (SOC) condition of the battery 28. The TCU 16 may be configured to operate the transmission 26 such as speed ratios of the transmission 26 based on output torque of the engine 20 and the motor 24, and an amount of regenerative braking. The engine 20 may be configured to output power as a power source while turned on.

The engine clutch 22 may be disposed between the engine 20 and the motor 24 to receive a control signal of the HCU 10, and may be configured to selectively connect the engine 20 and the motor 24 according to a driving mode of the hybrid electric vehicle. The motor 24 may be operated by a 3-phase alternating current (AC) voltage applied from the battery 28 via an inverter to generate torque, and may be configured to operate as a power generator and supply regenerative energy to the battery 28 in a coast-down mode. The transmission 26 may be configured to supply a sum of an output torque of the engine 20 and an output torque of the motor 24 determined by coupling and releasing of the engine clutch 22 as an input torque, and select a shift gear, according to a vehicle speed and a driving condition, to output driving force to a driving wheel and maintain vehicular speed.

The battery 28 may include a plurality of unit cells, and may be configured to store a substantially high voltage for supplying a voltage to the motor 24, for example, about 400 V to 450 V DC. The battery 28 may be configured to supply a voltage to the motor 24 for supporting power output from the engine 20 in an HEV mode or to provide driving force in an EV mode, and may be charged by regenerative braking energy.

Figure 2:
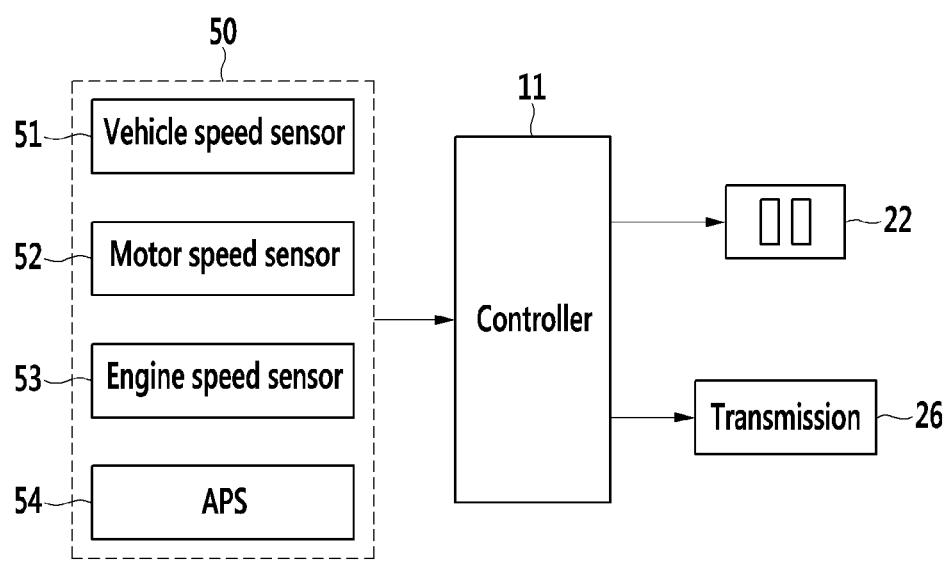
FIG. 2 is an exemplary block diagram of an apparatus for controlling a mode change of a hybrid electric vehicle according to an exemplary embodiment of the present invention.

FIG. 2 is an exemplary block diagram of an apparatus for controlling a mode change of a hybrid electric vehicle according to an exemplary embodiment of the present invention. As shown in FIG. 2, such an apparatus may include an engine clutch 22, a transmission 26, a driving information detector 50, and a controller 11.

Some processes in the method for controlling a mode change of the hybrid electric vehicle according to an exemplary embodiment of the present invention, to be described below, may be performed by the TCU 16, and some other processes may be performed by the HCU 10. Accordingly, for convenience of description many controllers provided in the hybrid electric vehicle such as the TCU 16 and the HCU 10 are called the controller 11.

The hybrid electric vehicle, to which an exemplary embodiment of the present invention may be applied, includes at least one engine 20 and at least one motor 24. In addition, the hybrid electric vehicle may be configured to provide a driving mode in which the engine 20 and the motor 24 operate separately or simultaneously as a power source. For this purpose, the engine clutch may be disposed between the engine 20 and the motor 24 to selectively connect the engine 20 and the motor 24. The driving information detector 50 of the hybrid electric vehicle may be configured to detect a demand of the driver and the driving state of the vehicle, and may include at least one of a vehicle speed sensor 51, a motor speed sensor 52, an engine speed sensor 53 and an accelerator pedal position sensor (APS) 54.

The vehicle speed sensor 51 may be mounted to a wheel of the hybrid electric vehicle, be configured to detect a speed of the vehicle, and transmit a corresponding signal to the controller 11. The motor speed sensor 52 may be configured to detect a rotation speed of the motor 24 and transmit a corresponding signal to the controller 11. The engine speed sensor 53 may be configured to detect a rotation speed of the engine 20 and transmit a corresponding signal to the controller 11. The accelerator pedal position sensor 54 may be configured to continuously detect a position value of an accelerator pedal and transmit a monitoring signal to the controller 11. The position value of the accelerator pedal may be about 100% when the accelerator pedal is pressed fully (e.g., fully engaged), and the position value of the accelerator pedal may be about 0% when the accelerator pedal is not pressed at all (e.g., is disengaged). A throttle valve position sensor (TPS) that is mounted on an intake pipe may be used instead of the accelerator pedal position sensor 54. Therefore, in this specification and the scope of the appended claims, the accelerator pedal position sensor 54 should include the throttle valve position sensor, and the position value of the accelerator pedal should be understood to be an opening value of the throttle valve.

The controller 11 may also be configured to operate the engine clutch 22 and the transmission 26 based on a signal output from the driving information detector 50. The controller 11 may be configured to compare an input speed of a current gear of the transmission 26 with an engine speed in an idle state when coupling of the engine clutch 22 and a shifting of the transmission 26 are required, and simultaneously perform coupling of the engine clutch 22 and shifting of the transmission when the input speed of the current gear of the transmission 26 is greater than or equal to the engine speed in the idle state and the kick down shift is required. Herein, the controller 11 may be configured to simultaneously perform the coupling of the engine clutch 22 and the shifting of the transmission 26 in a real shifting region of the transmission 26. In addition, the controller 11 may be configured to perform a shift when the input speed of the current gear of the transmission 26 is less than the engine speed in the idle state, may be configured to compare the input speed of the current gear of the transmission 26, which has been shifted, with the engine speed in the idle state once again, and may be configured to couple the engine clutch 22 after shifting, when the input speed of the current gear of the transmission 26 is greater than or equal to the engine speed in the idle state.

Furthermore, the controller 11 may be configured to compare an input speed of a target gear of the transmission 26 with the engine speed in the idle state when the input speed of the current gear of the transmission 26 is greater than or equal to the engine speed in the idle state and the kick down shift is not required. The controller 11 may be configured to couple the engine clutch 22 in advance without shifting when the input speed of the target gear of the transmission 26 is less than the engine speed in the idle state. Then, after the coupling of the engine clutch 22, the controller 11 may be configured to perform shifting of the transmission 26.

Additionally, the controller 11 may be configured to perform the shifting in advance and couple the engine clutch 22 when the input speed of the target gear of the transmission 26 is greater than or equal to the engine speed in the idle state. Accordingly, the controller 11 may be implemented as at least one processor that is operated by a predetermined program, and the predetermined program may be programmed to perform each step of a method for controlling a mode change of the hybrid electric vehicle according to an exemplary embodiment of the present invention.

Figure 3:
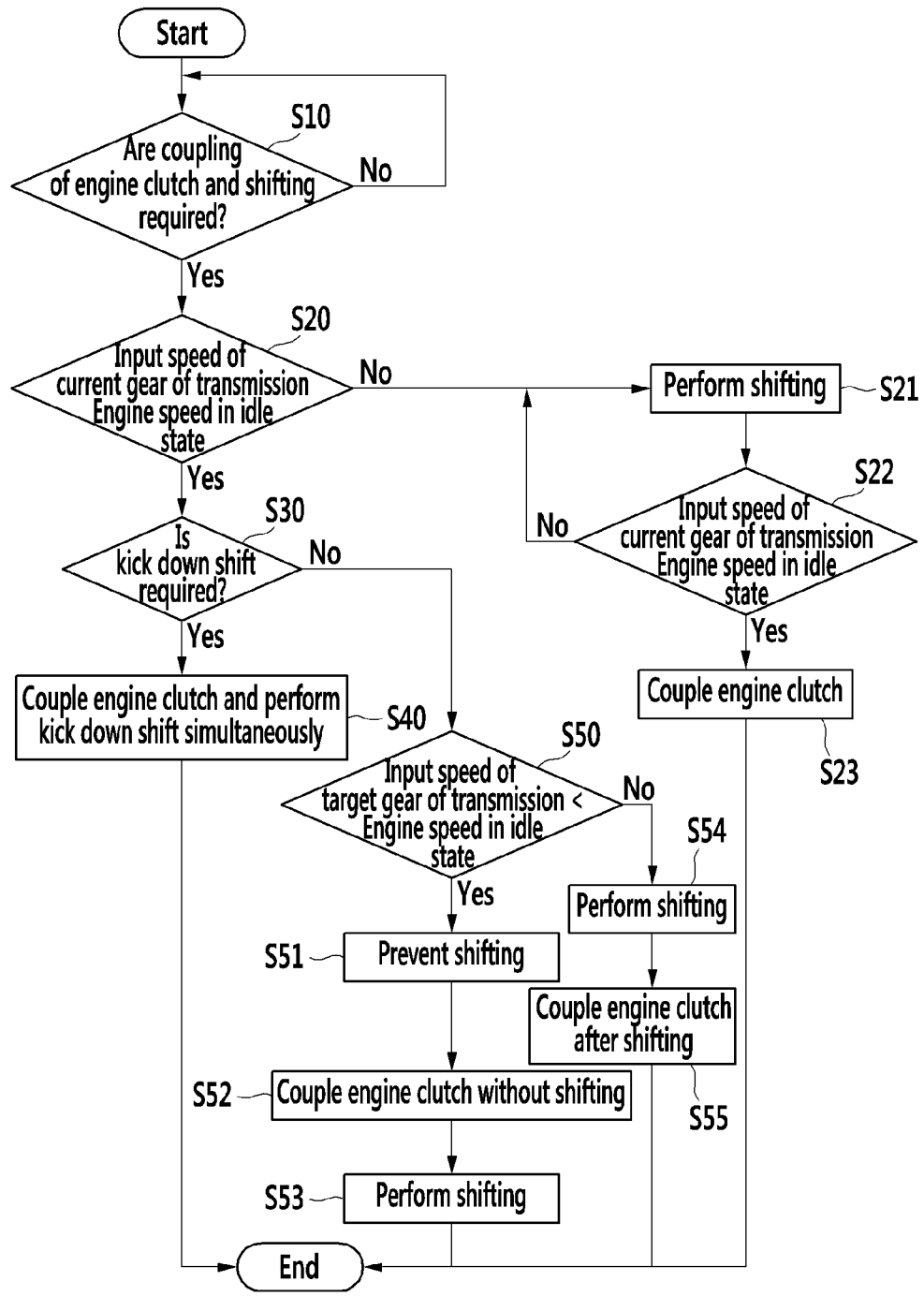
FIG. 3 is an exemplary flowchart showing a method for controlling a mode change of a hybrid electric vehicle according to an exemplary embodiment of the present invention.

Hereinafter, a method according to an exemplary embodiment of the present invention will be described in detail with reference to FIG. 3 and FIG. 4. FIG. 3 is an exemplary flowchart showing a method for controlling a mode change of the hybrid electric vehicle according to an exemplary embodiment of the present invention. As shown in FIG. 3, a method may start with determining whether coupling of the engine clutch 22 according to mode change from an electric vehicle (EV) mode to a hybrid electric vehicle (HEV) mode and shifting of the transmission 26 are required based on a signal output from the driving information detector 50 (S10).

When the coupling of the engine clutch 22 and the shifting are required (S10), the controller 11 may be configured to compare an input speed of a current gear of the transmission 26 with an engine speed in an idle state (S20). When the input speed of the current gear of the transmission 26 is greater than or equal to the engine speed in the idle state (S20), the controller 11 may be configured to determine whether the shifting required (S10) is a kick down shift (S30).

Further, when the input speed of the current gear of the transmission 26 is less than the engine speed in the idle state (S20), the controller 11 may be configured to perform shifting of the transmission 26 (S21). When the shifting is performed (S21), the controller 11 may be configured to compare the input speed of the current gear of the transmission 26, which has been shifted, with the engine speed in the idle state once again (S22). When the input speed of the current gear of the transmission 26 is greater than or equal to the engine speed in the idle state, the controller 11 may be configured to couple the engine clutch 22 (S23). When the kick down shift is required (S30), the controller 11 may be configured to simultaneously couple the engine clutch 22 and perform the kick down shift (S40).

However, when the kick down shift is not required (S30), the controller 11 may be configured to compare an input speed of a target gear of the transmission 26 with the engine speed in the idle state (S50). When the input speed of the target gear of the transmission 26 is less than the engine speed in the idle state (S50), the controller 11 may be configured to prevent the shifting (S51) since the engine speed may not be increased rapidly enough. The controller 11 may then be configured to couple the engine clutch 22 in advance (S52), and perform the shifting (S53). When the input speed of the target gear of the transmission 26 is greater than or equal to the engine speed in the idle state (S50), the controller 11 may be configured to perform the shifting (S54), and couple the engine clutch 22 (S55).

Figure 4:
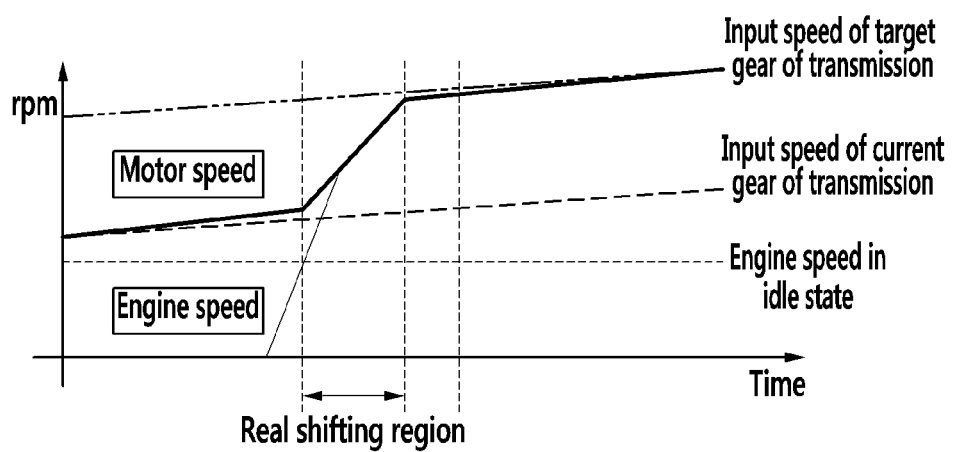
FIG. 4 is an exemplary graph describing an operation principle of a method for controlling a mode change of a hybrid electric vehicle according to an exemplary embodiment of the present invention.

FIG. 4 is an exemplary graph describing an operation principle of a method for controlling a mode change of the hybrid electric vehicle according to an exemplary embodiment of the present invention. As shown in FIG. 4, the input speed of the current gear of the transmission 26 and the input speed of the target gear of the transmission 26 may have a substantially constant slope. Therefore, when the input speed of a current gear of the transmission 26 is greater than or equal to the engine speed in an idle state, the controller 11 may be configured to execute coupling of the engine clutch 22 in a real shifting region. In other words, the controller 11 may be configured to perform the coupling of the engine clutch 22 and the shifting of the transmission 26 simultaneously, to increase responsiveness of the torque demand (e.g., of the driver).

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A method for controlling a mode change of a hybrid electric vehicle having an engine as a power source, a motor selectively connected to the engine via an engine clutch, and a transmission connected to the motor, the method comprising:
   determining, by a controller, whether coupling of the engine clutch and shifting of the transmission are required during a mode change from an electric vehicle (EV) mode to a hybrid electric vehicle (HEV) mode;
   comparing, by the controller, an input speed of a current gear of the transmission with an engine speed in an idle state when the coupling of the engine clutch and the shifting of the transmission are required;
   determining, by the controller, whether a kick down shift is required when the input speed of the current gear of the transmission is greater than or equal to the engine speed in the idle state; and
   simultaneously coupling, by the controller, the engine clutch and performing, by the controller, the kick down shift when the kick down shift is required.

2. The method of claim 1, wherein when the input speed of the current gear of the transmission is less than the engine speed in the idle state, the method further comprises:
   performing, by the controller, shifting of the transmission; and
   coupling, by the controller, the engine clutch when the input speed of the current gear of the transmission is greater than or equal to the engine speed in the idle state after shifting of the transmission.

3. The method of claim 1, wherein when the kick down shift is not required, the method further comprises:
   comparing, by the controller, an input speed of a target gear of the transmission with the engine speed in the idle state;
   coupling, by the controller, the engine clutch without shifting of the transmission when the input speed of the target gear of the transmission is less than the engine speed in the idle state; and
   performing, by the controller, shifting of the transmission after coupling of the engine clutch.

4. The method of claim 3, wherein when the input speed of the target gear of the transmission is greater than or equal to the engine speed in an idle state, the method further comprises performing, by the controller, shifting of the transmission and coupling the engine clutch.

5. An apparatus for controlling a mode change of a hybrid electric vehicle having an engine as a power source, a motor selectively connected to the engine via an engine clutch, and a transmission connected to the motor, the apparatus comprising:
   a driving information detector configured to detect a current driving state of the hybrid electric vehicle; and
   a controller configured to:
      control operations of the transmission and the engine clutch based on a signal output from the driving information detector,
      compare an input speed of a current gear of the transmission with an engine speed in an idle state when coupling of the engine clutch and shifting of the transmission are required;

determine whether a kick down shift is required when the input speed of the current gear of the transmission is greater than or equal to the engine speed in the idle state; and perform coupling of the engine clutch and shifting of the transmission when the input speed of the current gear of the transmission is greater than or equal to the engine speed in the idle state and the kick down shift is required.

6. The apparatus of claim 5, wherein the driving information detector includes at least one of a vehicle speed sensor, a motor speed sensor, an engine speed sensor, and an accelerator pedal position sensor.

7. The apparatus of claim 5, wherein the controller is configured to simultaneously perform the coupling of the engine clutch and the shifting in a real shifting region of the transmission.

8. The apparatus of claim 5, wherein the controller is configured to:

perform a shift of the transmission when the input speed of the current gear of the transmission is less than the engine speed in the idle state; and couple the engine clutch after shifting of the transmission when the input speed of the current gear of the transmission is greater than or equal to the engine speed in the idle state.

9. The apparatus of claim 5, wherein the controller is configured to:

compare an input speed of a target gear of the transmission with the engine speed in the idle state when the kick down shift is not required;

couple the engine clutch in advance without shifting the transmission when the input speed of the target gear of the transmission is less than the engine speed in an idle state; and perform shifting of the transmission after the coupling of the engine clutch.

10. The apparatus of claim 9, wherein the controller is configured to perform the shifting of the transmission and couple the engine clutch when the input speed of the target gear of the transmission is greater than or equal to the engine speed in the idle state.

11. A non-transitory computer readable medium containing program instructions executed by a processor or controller for controlling a mode change of a hybrid electric vehicle having an engine as a power source, a motor selectively connected to the engine via an engine clutch, and a transmission connected to the motor, the computer readable medium comprising:

program instructions that determine whether coupling of the engine clutch and shifting of the transmission are required during a mode change from an electric vehicle (EV) mode to a hybrid electric vehicle (HEV) mode;

program instructions that compare an input speed of a current gear of the transmission with an engine speed in an idle state when the coupling of the engine clutch and the shifting of the transmission are required;

program instructions that determine whether a kick down shift is required when the input speed of the current gear of the transmission is greater than or equal to the engine speed in the idle state; and program instructions that simultaneously couple the engine clutch and perform the kick down shift when the kick down shift is required.

12. The non-transitory computer readable medium of claim 11, wherein when the input speed of the current gear of the transmission is less than the engine speed in the idle state, the computer readable medium further comprising:

program instructions that perform shifting of the transmission; and program instructions that couple the engine clutch when the input speed of the current gear of the transmission is greater than or equal to the engine speed in the idle state after shifting of the transmission.

13. The non-transitory computer readable medium of claim 11, wherein when the kick down shift is not required, the computer readable medium further comprising:

program instructions that compare an input speed of a target gear of the transmission with the engine speed in the idle state;

program instructions that couple the engine clutch without shifting of the transmission when the input speed of the target gear of the transmission is less than the engine speed in the idle state; and program instructions that perform shifting of the transmission after coupling of the engine clutch.

14. The non-transitory computer readable medium of claim 13, wherein when the input speed of the target gear of the transmission is greater than or equal to the engine speed in an idle state, the computer readable medium further comprising:

program instructions that perform shifting of the transmission and coupling the engine clutch.

* * * * *